United States Patent [19]

Safferman et al.

[11] Patent Number: 5,487,829
[45] Date of Patent: Jan. 30, 1996

[54] INTERNAL MEDIA CLEANING DEVICE FOR AEROBIC FLUIDIZED BED REACTORS

[75] Inventors: Steven I. Safferman; Paul L. Bishop, both of Cincinnati, Ohio

[73] Assignees: The Unite States of America as represented by the Administrator of the United States Environmental Protection Agency, Washington, D.C.; The University of Cincinnati, Cincinnati, Ohio

[21] Appl. No.: 205,364

[22] Filed: Mar. 3, 1994

[51] Int. Cl.$^6$ ........................................... C02F 3/08
[52] U.S. Cl. ........................... 210/151; 210/274; 210/618
[58] Field of Search ................................. 210/618, 151, 210/274

[56] References Cited

U.S. PATENT DOCUMENTS

| | | | |
|---|---|---|---|
| 4,009,099 | 2/1977 | Jeris | 210/3 |
| 4,177,144 | 12/1979 | Hickey et al. | 210/618 |
| 4,182,675 | 1/1980 | Jeris | 210/8 |
| 4,225,430 | 9/1980 | Bosman | 210/610 |
| 4,250,033 | 2/1981 | Hickey et al. | 210/106 |
| 4,256,573 | 3/1981 | Shimodaira et al. | 210/618 |
| 4,322,296 | 3/1982 | Fan et al. | 210/610 |
| 4,534,864 | 8/1985 | Rigouard | 210/603 |
| 4,612,115 | 9/1986 | Titoff | 210/618 |
| 4,681,685 | 7/1987 | Sutton et al. | 210/618 |
| 4,707,252 | 11/1987 | Durot et al. | 210/151 |
| 5,126,042 | 6/1992 | Malone | 210/150 |

FOREIGN PATENT DOCUMENTS

| | | |
|---|---|---|
| 0007783 | 2/1990 | European Pat. Off. . |
| 2053882 | 2/1981 | United Kingdom . |

*Primary Examiner*—Ivars Cintins
*Attorney, Agent, or Firm*—Browdy and Neimark

[57] ABSTRACT

An improved reactor for treatment of wastewater having an influent line for wastewater, and effluent line for treated wastewater, and an aerobic bed fluidized by wastewater from the influent line. The bed is located between the influent line and the effluent line and contains particulate media seeded with a layer of bacteria. The improved reactor consists of an internal particulate media cleaning means located between the bed and an outlet to the effluent line for creating turbulence which shears excess biomass from the particulate media within the cleaning means and permits controlled exit of the excess biomass from the cleaning means and the reactor while maintaining cleaned media within the reactor. The internal particulate media cleaning means has at least one cylindrical screen with a longitudinal passage therethrough. The screen is respectively engaged to an inner periphery of the reactor above and below an outlet to the effluent line by gaskets fixed on opposite ends of the screen. Air delivery means extend into the longitudinal passage for delivery of air to produce turbulence in a mixture of the waste water and the particulate media within the longitudinal passage.

11 Claims, 2 Drawing Sheets

INTERNAL MEDIA CLEANING DEVICE FOR AEROBIC FLUIDIZED BED REACTORS

BACKGROUND OF THE INVENTION

1. Field of the Invention

This invention is directed to an internal media cleaning device for improved treatment of hazardous industrial and/or domestic wastewater, in aerobic fluidized bed reactors. In particular, the invention provides an effective and economical means for separating excess biomass from particulate media, while maintaining the cleaned particulate media within the reactor.

2. Prior Art

Once the particulate media becomes heavily coated with excess biomass in conventional prior art aerobic fluidized bed reactors, the density of the individual media particle decreases and their terminal velocity becomes less than that of the velocity of the influent waste stream. This results in flotation of the particulate media into the effluent stream and their removal from the reactor.

Conventionally, excess biomass growth on the particulate media has been removed by subjecting the individual particles to high levels of turbulence that cause shearing of the biomass from the particulate media. The most common means to achieve biomass removal has been to allow the heavily biomass coated particulate media to float out of the reactor through the effluent line and then create a turbulent zone in a supplemental reaction vessel. Such turbulent zones have been created by passing the particulate media through a pump with rubber impellers or mechanically mixing the particles within the supplemental reactor. The biomass is then typically separated from the particulate media and the particulate media thereafter returned to the reactor.

An alternative conventional design is directed to removing the biomass from the particulate media within the top portion of the reactor by creating a turbulent zone by use of mechanical mixers. See in this regard, Jeris et al., "Biological Fluidized-Bed Treatment for BOD and Nitrogen Removal," *Journal WPCF*, vol. 49, no. 5, pp. 816–831, 1977.

An additional alternative utilizes intermittent air scouring within the bed to create turbulence throughout the entire bed (Jennings, Paul A., "A Mathematical Model for Biological Activity in Expanded Bed Absorption Columns," PhD Thesis, Univ. of Illinois at Urbana-Champaign, 1975; Greddertz et al., "Offline Regeneration of Granular Activated Carbon, "*ASCE Journal of Environmental Engineering*, vol. 114, no. 5, pp. 1063–1076, 1988). A variation of this design involves an expansion of the reactor's diameter near its top that results in a reduction of the fluid's upward velocity to create a media settling zone. The particulate media is then cleaned by periodic air scouring within this settling zone (Livingston, A. G., "Biodegradation of 3,4-Dichloraniline in a Fluidized Bed Bioreactor and a Steady-State Biofilm Kinetic Model," *Biotechnology and Bioengineering*, vol. 38, pp. 260–272, 1991.) These described conventional devices generally prevent the particulate media from spilling into the effluent line during high turbulence cleaning by reducing the bed height by reducing the influent flow rate.

Some United States Patents covering the control of biomass in fluidized bed reactor designs using the methods discussed above or variations of these methods include U.S. Pat. Nos. 4,009,098, 4,009,099, 4,322,296, 4,681,685 and 4,707,252.

Jeris, U.S. Pat. Nos. 4,009,098, 4,009,099, and 4,182,675, disclose fluidized processes that include a means for separating biomass from media bed particles to which they are attached. The relevant disclosures in the three aforementioned Jeris patents are very similar as reflected in the embodiments disclosed in U.S. Pat. No. 4,009,098. One embodiment of U.S. Pat. No. 4,009,098, disclosed at col. 6, lines 24–38, involves removing a predetermined quantity of particles in an external abrasion vessel, and then, abrading the particles either mechanically with a rotating knife or with compressed air or water sprays. A second embodiment of U.S. Pat. No. 4,009,098, disclosed at col. 6, lines 42–50, involves the use of a rotating flexible agitator in the fluidized bed zone for separation and removal of biomass from media particles. Other separating means are disclosed, as follows; "other mechanical mixers, baffle plates and other abrasion-type surfaces or even water or compressed air jets directed upwardly and sidewardly against column walls to create agitation vortices and the like, as well as other suitable conventional agitating means, can be employed within the column" see col. 6, lines 50–56. Furthermore, col. 9, lines 58–65, discloses a means for preventing the agglomeration of bed particles by sub-dividing the fluidized bed into a number of vertical compartments of small cross-sectional area. However, Jeris U.S. Pat. No. 4,009,098, does not show the cleaning apparatus including a screen as set out in the claimed invention.

Durot et al., U.S. Pat. No. 4,707,252, discloses removal of excess biomass from granular material by hydraulic flux combined with a mechanically rotating device for "disembedding" granular material against a fixed cutting grill. However, this cutting grill does not function as a filter; instead, it allows granular material to pass through.

Hickey et al., EP 0,007,783, discloses placement of an internal separator column with a draw-off port in the fluidized bed reactor to separate biomass from particulate media. Shearing forces necessary to effect removal of biomass from particulate media can be generated, as disclosed by separate embodiments, either by a mixing blade, or by sonic or ultrasonic shear. Other embodiments disclose using an external loop with an external pump to effect mechanical shear or an external loop with constricted or sinuous flow path for hydraulic shear. Compressed air, with or without a mixing motor, is another alternate embodiment for an internal separating means. Sheared particulates settle back into the fluidized bed; sheared biomass is removed via a draw-off port.

OBJECTIVES AND SUMMARY OF THE INVENTION

It is a primary objective of the invention to provide an effective and economical means for separating excess biomass from particulate media by internal media cleaning within a fluidized bed reactor without using mechanical devices within the reactor while maintaining the cleaned particulate media within the reactor as the biomass is expelled.

It is another objective of the invention to control the release of suspended solids so the continuous treatment of the suspended solids after the fluidized bed is not necessary.

A further object of the invention is to provide an efficient waste treatment process able to operate at uninterrupted flow rates compared to conventional processes without loss of particulate media.

Other objects or advantages will become apparent from the following detailed discussion of the invention.

The above and other objects are met in a process for removing organic carbon from waste water by use of aerobic or facultative biota attached to a solid particulate media adapted to be fluidized. The biota is adapted to reduce biochemical oxygen demand during fluidization. Thereafter, sufficient amounts of oxygen is introduced into the bed to allow the biota to reduce the biochemical oxygen demand of the waste water passing therethrough. Finally, excess bacterial growth formed on the media during the process is removed while the cleaned media is maintained within the bed.

The term "fluidized bed" as employed herein refers to the flow of a suitable liquid upwardly through a bed of suitably sized particles at a velocity sufficiently high to buoy the particles, to overcome the influence of gravity, and to impart to them an appearance of movement within the bed; said bed being expanded to a greater depth than when no flow is passing therethrough.

As waste water containing Biochemical Oxygen Demand (BOD), in the form of organic carbon or the like, is passed through the fluidized bed, bacterial growth on the particles is accelerated, and the bed-particle size increases. If unchecked, the bed particles become enlarged and may agglomerate, thus reducing the biological surface area per unit volume of the reactor and therefore the efficiency of the column. Further, the particles tend to be reduced in specific gravity as they enlarge and/or agglomerate and tend to be carried away from the bed. It is a feature of the present process that the excess bacterial growth formed on the particles during the process is hydraulically removed thereby overcoming the tendency of the particles to be carried away from the bed and by further providing means to maintain the cleaned particles within the reactor.

The invention includes an internal media cleaning device, located at the top of a fluidized bed reactor, which has a cylindrical open ended screen near an effluent line, and an open air line located in the middle of the screen and at or slightly below the water surface. Each end of the screen has a notched gasket engaged around the open end that prevents entry of media particles but allows water and gases to flow between the reactor wall and the periphery of the screen. Turbulence, caused by the introduction of air through the open air line, in combination with the rough surface of the screen, effectively separates the accumulated biomass for removal from the media particles in the effluent stream. The screen mesh prevents the media particles from also exiting in the effluent.

The internal media cleaning device, according to the invention, cleans particulate media by removal of excess biomass from the media particles within the reactor, thereby eliminating the need for transporting the particulate media to cleaning systems outside the reactor and then back to the reactor after cleaning. The design of the internal media cleaning device also allows for the control of the thickness of the biomass attached to the media, thus providing a basis for design and operation.

The particulate media cleaning system is located at the top of a conventional aerobic fluidized bed reactor and provides a turbulent region that shears biomass from the media particle. A cylindrical screen having a longitudinal passage therethrough, a diameter approximately 1 cm less than that of the reactor's diameter and a mesh size of approximately half to a quarter of the smallest desirable media particle diameter, is placed over the outlet to the effluent line. Each end of the screen has a notched gasket that prevents passage of media particles but allows water and gases to flow between the inner reactor wall and the outer periphery of the screen. The notches are provided on the gaskets to permit the flow of water therethrough to dislodge particulate media on the screen. The design of the screen is such that only water, gases, and particles less than half the size of the smallest media's diameter are able to pass into the effluent line. The turbulence is provided by periodically applying air pressure (of at least 12 psi) through an open air line located in the middle of the screen passage at the water surface or slightly below the water surface.

For reactors with large diameters, a honeycomb network of screens can be utilized for media washing instead of just one screen. As with a single screen, turbulence caused by the air pressure and the rough surface of the screen subjects the media particles to high shear forces that effectively remove loose biomass. That biomass can then exit the reactor through the screens while the screens prevent the media from exiting. In either case, the result is that the cleaned media particle's apparent density becomes close to that of the virgin media particles resulting in proper fluidization within the reaction zone of the reactor. The quantity of biomass attached to the media particles can be controlled by adjusting the location of the effluent port and the frequency of the cleaning cycle.

In addition to the media cleaning device, a media return and a bed lifter contribute to successful reactor operation.

The turbulence associated with the cleaning device can spray media into the buffer zone of the reactor. This material must be periodically returned to the reactor. This is achieved by a media return system that consists of a spray nozzle (or nozzles for larger diameter reactors) located at the top of the reactor. The schedule of operation of the media return system and the quantity of water needed to wash the particulate media back into the reactor is determined for each specific application. The water used to feed the media return system can be obtained from a line from the effluent line of the reactor to the spray nozzle. This eliminates the need for additional potable water.

Depending on the waste stream to be treated, media particles can come together and act as composite particles instead of individual particles. A composite particle is too heavy to rise to the top of the reactor for cleaning and can ultimately cause reactor failure. To prevent the formation of composite particles, the improved reactor with internal media cleaning device according to the invention utilizes a bed lifter to force more space between individual media particles. Because of the turbulence within the bed caused by the bed lifter, only a few heavily biomass-coated particles can reach the cleaning zone at one time which results in effective cleaning. If the entire bed reached the cleaning zone at once, effective cleaning would not result. The bed lifter consists of one or more of nozzles below a particulate media retention screen or other media support structure that can deliver small quantities of low pressure air from a source of pressurized air or water recycled from the reactor's effluent line. The quantity of water or air and operation time depend on the specific reactor application and can be automatically controlled.

The invention will be described in further detail below in conjunction with drawings that show several embodiments. Further, essential characteristics and advantages of the invention will become apparent from the drawings and their descriptions.

DETAILED DESCRIPTION OF THE PREFERRED EMBODIMENTS OF THE INVENTION

Figure 1:
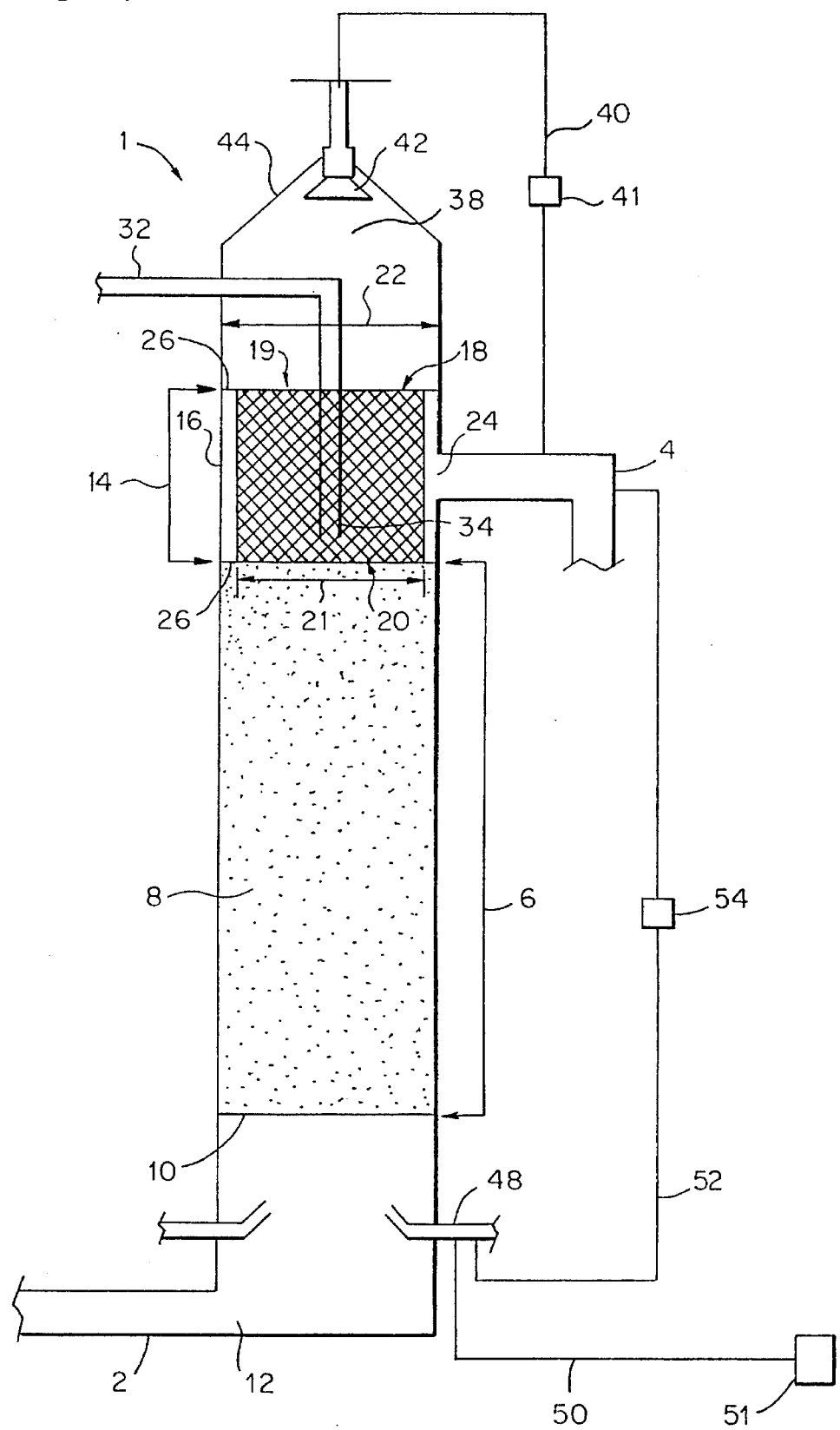
FIG. 1 shows a cut away elevation view of an aerobic fluidized bed reactor including the internal media cleaning device in accordance with the invention.

FIG. 1 of the drawings shows a conventional cylindrical aerobic fluidized bed reactor 1 having an influent line 2 for introduction of waste water into the lower portion of the reactor and an effluent line 4 for discharge of treated waste water after passage through a reaction zone 6 lying between influent line 2 and effluent line 4. Reaction zone 6 is filled with a particulate media 8 made from any conventional material, for example 16×20 mesh activated carbon seeded with heterotrophic bacteria. Of course, other particulate media such as coal, volcanic cinders, glass or plastic beads and sand alumina, all having a thin layer of bacteria seeded thereon, may also be used. Preferably the particles are of a uniform size.

The bottom of the reaction zone 6 is defined by a particulate media retention screen or other support mechanism 10 which maintains the particulate media above inlet 12 of influent line 2 and permits waste water introduced through influent line 2 to enter and pass through reaction zone 6 as is common to any conventional fluidized bed reactor.

At the upper surface of the reaction zone 6, an internal particulate media cleaning zone 14 is provided. Within cleaning zone 14, turbulence can be created which shears excess biomass from the particulate media while maintaining the cleaned media within reactor 1.

The cleaning zone 14 is provided with a cylindrical screen 16 having a longitudinal passage 19 with open ends 18 and 20, a diameter 21 approximately 1 cm less than that of the reactor's inner diameter 22 and a mesh size approximately half to a quarter of the smallest desirable media particle diameter. Screen 16 is coaxially fixed by upper and lower gaskets 26 within the inner periphery of the reactor 1, above reaction zone 6, centered longitudinally at outlet 24 of effluent line 4.

Figure 2:
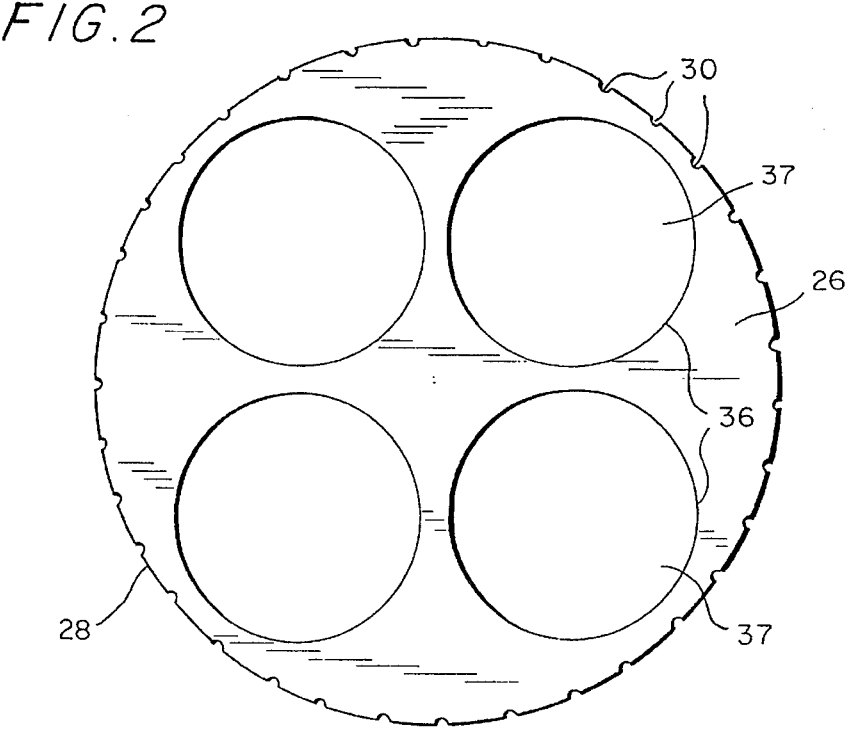
FIG. 2 shows a top view of an alternate embodiment of the screening component of the internal media cleaning device of FIG. 1.
Figure 3:
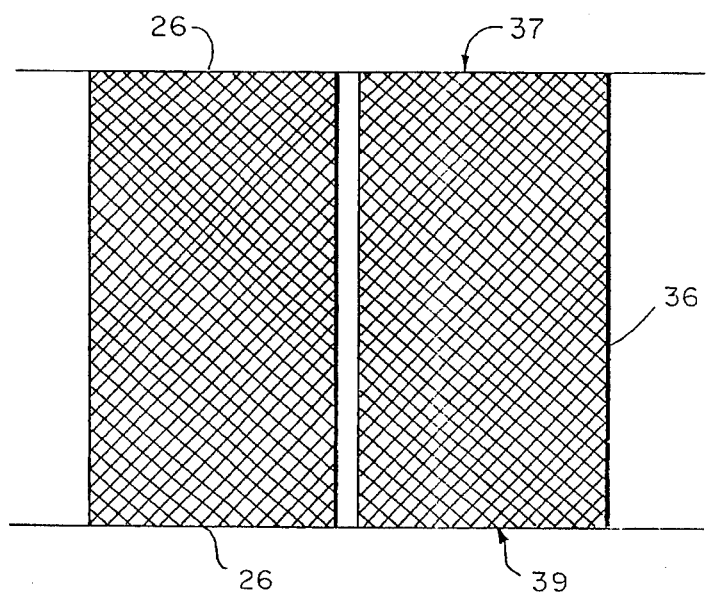
FIG. 3 is an elevation view of the screening component of FIG. 2.
Figure 4:
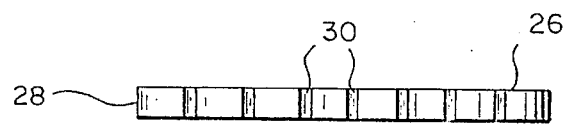
FIG. 4 is a partial elevation view of a gasket of the screening component of FIGS. 1 and 2.

Gaskets 26 have an outer diameter substantially equal to the inner diameter 22 of reactor 1 and are integrally fixed at the upper and lower ends of screen 16. As shown in FIGS. 2 and 4, the outer periphery 28 of compressible gaskets 26 have notches 30 which permit water to flow between the inner periphery of reactor 1 and the outer periphery of screen 16 while precluding entry of particles of the particulate media. Gaskets 26 can be made from any compressible material such as rubber or similar material to permit engagement to the reactor 1 while also permitting removal of screen 16 when replacement is desirable.

When screen 16 is positioned as shown in FIG. 1 in reactor 1, it permits treated waste water, gases and particles less than half the size of the smallest particulate media to flow through open end 20, into longitudinal passage 19, through screen 16 and thereafter out through outlet 24 of effluent line 4. As indicated above, notches 30 also permit water within reactor 1 to flow between the inner periphery of the reactor and the outer periphery of screen 16 to assist in dislodging particles of the particulate media from screen 16.

Turbulence to shear excess biomass from the particulate media is provided by periodically applying air pressure (of at least 12 psi) through open air line 32 which extends through opening 18 of screen 16. The axis of air line 32 is coaxial with the axis of screen 16 and reactor 1. End 34 of air line 32 is positioned to be approximately at the water surface or slightly below the water surface of the waste water which has passed through reaction zone 6 and into passage 19 through opening 20.

A honeycomb network of screens 36 as shown in FIG. 2, can be utilized for media washing in reactors with large diameters instead of a single screen 16 as shown in FIG. 1. When a network of screens 36 is used an air line 32 is associated through opening 37 of each screen 36 in a same manner as screen 16 to agitate heavily biomass-coated media particles which have passed through reaction zone 6 and into screens 36 through openings 39.

In both the embodiment of FIG. 1 and 2, turbulence caused by the air pressure and the rough surface of the screen subjects media particles to high shear forces that effectively remove loose and excess biomass. This material can then exit reactor 1 through screen 16 or screens 36 while preventing exit of the cleaned particulate media.

This results in the apparent density of the clean particulate media becoming close to that of the virgin media particles with the further result of more proper fluidization within reaction zone 6 of reactor 1. The quantity of biomass attached to the media particles can be controlled by adjusting the locations of effluent outlet 24 and the frequency of the cleaning cycle.

In addition to the media cleaning apparatus discussed above two supplementary elements discussed below contribute to successful operation of the improved reactor 1 according to the claimed invention.

The turbulence associated with the cleaning device results in particulate media being sprayed into buffer zone 38 above cleaning zone 14 of reactor 1. This material must be periodically returned to the reactor. This is achieved by a spray nozzle 42 (or nozzles for larger diameter reactors) located at top 44 of reactor 1. The nozzle is fed with water through line 40 from effluent line 2 or a potable water source which is then sprayed down into buffer zone 38 and onto the inner periphery of the reactor above screen 16 or screens 36. The water from nozzle thus returns particles within the buffer zone 38 to the reactor and also flows through notches 30 of gaskets 26 to dislodge particulate media from screen 16 or screens 36 for return in the reactor.

The schedule of operation of the media return system and the quantity of water needed to wash particles of particulate media back into reactor 1 is determined for each specific application and can be controlled by automated operation of valve and/or pumper 41 in line 40. As noted, the water used to feed the media return system is obtained from the reactor's effluent and fed to the system through line 40, thereby eliminating the use of additional potable water if desirable.

Depending on the waste stream to be treated, media particles can come together and act as composite particles instead of individual particles. A composite particle is too heavy to rise to the top of the reactor for cleaning and can ultimately cause reactor failure. To prevent the formation of composite particles and assure that composite particles reach cleaning zone 14, the reactor according to the invention utilizes a bed lifter to force more space between individual media particles. In addition, the bed lifter causes only heavily biomass-coated media to reach the cleaning zone, 14, which results in effective cleaning. If the entire bed were to reach the cleaning zone 14, effective operation would not occur. The bed lifter consists of one or more nozzles 48 below the carbon support structure 10 that can deliver small quantities of low pressure air through air line 50 from an automated source of pressurized air 51 or water, recycled from the reactor's effluent line through line 52. The quantity of water or air and operation time depend on the specific reactor application which can be controlled by automated operation of valve/pump 54 in line 52 or control of the automated source of pressurized air 51.

What is claimed is:

1. An improved reactor for treatment of wastewater having an influent line for wastewater, and effluent line for treated wastewater, and an aerobic bed fluidized by wastewater from said influent line, said bed being located between said influent line and said effluent line and containing particulate media seeded with a layer of bacteria, said improved reactor comprising:

internal particulate media cleaning means located between said bed and an outlet to said effluent line for creating turbulence which shears excess biomass from said particulate media within said cleaning means and permits controlled exit of said excess biomass from said cleaning means and said reactor while maintaining cleaned media within said reactor, wherein said internal particulate media cleaning means comprises:
at least one cylindrical screen having a longitudinal passage therethrough,
said screen being respectively engaged to an inner periphery of said reactor above and below an outlet to said effluent line by gaskets fixed on opposite ends of said screen, and
air delivery means extending into said longitudinal passage for delivery of air to produce turbulence in a mixture of said waste water and said particulate media within said longitudinal passage.

2. The improved reactor according to claim 1, wherein a plurality of notches are formed on an outer periphery of said gaskets,
said notches permitting water from within the reactor to flow between said periphery of said screen and said inner periphery of said reactor while excluding said particular media.

3. The improved reactor according to claim 1, wherein said screen has a mesh size smaller than a diameter of particles of said particulate media.

4. The improved reactor according to claim 1, wherein said screen has a mesh size approximately half to a quarter of the size of a diameter of particles of said particulate media.

5. The improved reactor according to claim 2 comprising a plurality of said cylindrical screens, each having a separate said air delivery means extending into said longitudinal passage.

6. The improved reactor according to claim 1 further comprising:
a buffer zone above said cleaning means in said reactor,
media return means communicating with said buffer zone for periodically returning particles of said particulate media within said buffer zone back to said cleaning means with water from said effluent line.

7. The improved reactor according to claim 6 wherein said media return means is controlled to periodically return said particulate media within said buffer zone to said cleaning means by an automated valve in a delivery line from said effluent line.

8. The improved reactor according to claim 6 wherein said media return means includes a nozzle located above said buffer zone and connected to a delivery line from said effluent line,
said nozzle spraying water from said effluent line into said buffer zone and onto said inner periphery of said reactor above said cleaning means.

9. The improved reactor according to claim 1, wherein said bacteria is a heterotrophic bacteria and said particulate media is 16×20 mesh activated carbon.

10. An improved reactor for treatment of wastewater having an influent line for wastewater, and effluent line for treated wastewater, and an aerobic bed fluidized by wastewater from said influent line, said bed being located between said influent line and said effluent line and containing particulate media seeded with a layer of bacteria, said improved reactor comprising:

internal particulate media cleaning means located between said bed and an outlet to said effluent line for creating turbulence which shears excess biomass from said particulate media within said cleaning means and permits controlled exit of said excess biomass from said cleaning means and said reactor while maintaining cleaned media within said reactor, a particulate media retention support system located below said particulate media and above an inlet for said influent line to permit waste water to enter into said particulate media, bed lifter means located below said particulate media retention support system for periodically forcing space between particles of said particulate media, said bed lifter means comprising a nozzle which delivers low pressure air through a line from an automated source of pressurized air or water from a line from said effluent line.

11. The improved reactor according to claim 10 wherein said lifter means is controlled to periodically force space between said particles by an automated valve in said line from said effluent line or said automated source of pressurized air.

* * * * *